April 7, 1970  S. BARBINI  3,505,575
MULTIPLE CAPACITOR
Filed May 17, 1968  9 Sheets-Sheet 1

April 7, 1970  S. BARBINI  3,505,575
MULTIPLE CAPACITOR

Filed May 17, 1968  9 Sheets-Sheet 5

FIG. 10
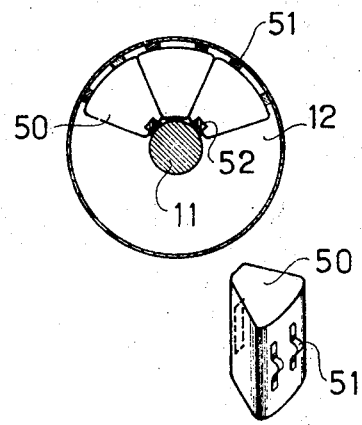
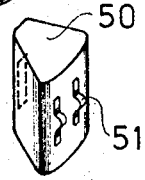
FIG.10a
FIG. 11
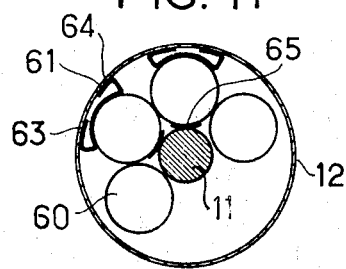
FIG. 12
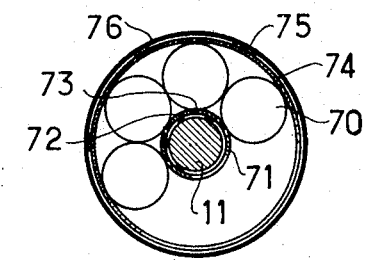

April 7, 1970     S. BARBINI     3,505,575
MULTIPLE CAPACITOR
Filed May 17, 1968             9 Sheets-Sheet 7
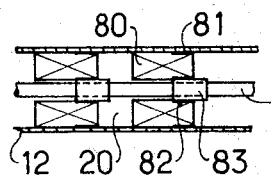
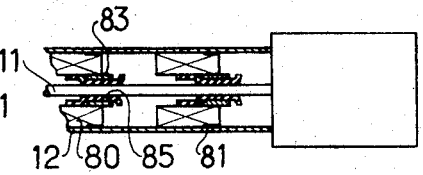
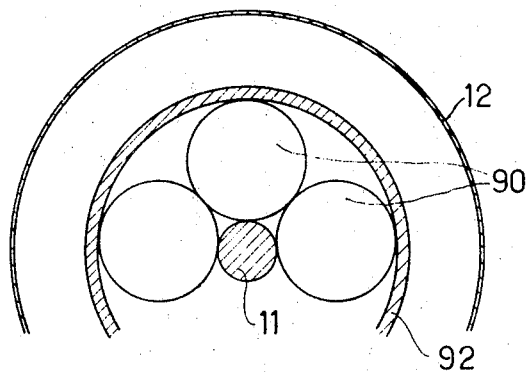
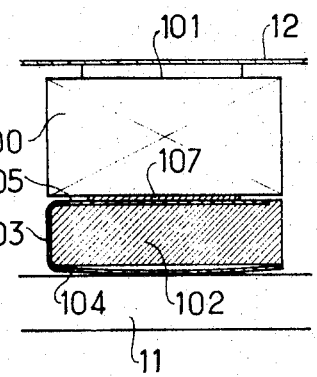
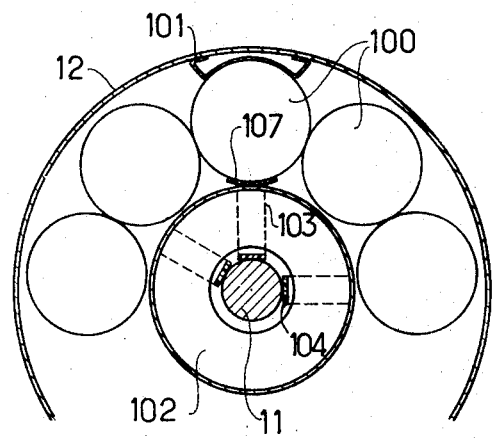

April 7, 1970  S. BARBINI  3,505,575
MULTIPLE CAPACITOR
Filed May 17, 1968  9 Sheets-Sheet 8

April 7, 1970   S. BARBINI   3,505,575

MULTIPLE CAPACITOR

Filed May 17, 1968   9 Sheets-Sheet 9

United States Patent Office 3,505,575
Patented Apr. 7, 1970

3,505,575
MULTIPLE CAPACITOR
Spartacus Barbini, Chaville, France, assignor to Compagnie Generale d'Electricite, Paris, France, a French corporation
Filed May 17, 1968, Ser. No. 730,157
Claims priority, application France, May 18, 1967, 106,890; June 16, 1967, 110,794
Int. Cl. H01g 5/01, 1/00
U.S. Cl. 317—242                     14 Claims

ABSTRACT OF THE DISCLOSURE

A capacitor is constructed as an elongated body containing the capacitive plates and provided on its lateral surfaces with terminals connected to the plates. The capacitor with lateral terminals may then be inserted with similar capacitors in a coaxial capacitive line between the core and the surrounding tube both of which are electrical conductive. In this way the capacitance between the core and the tube can be varied by introducing or removing capacitors from between them.

---

This invention concerns a capacitor which may have any desired capacity and is appropriately dimensioned to enable it to be fitted to a coaxial capacitive line containing a selected number of capacitors individually constructed in accordance with the invention.

There are many applications where it is required to provide sudden surges of electrical energy. The normal method of providing such surges is to discharge a charged capacitive discharge line. Very large pulses of energy can be released in this way.

The total capacitance of the discharge line determines the energy released when discharge occurs. The capacitors of the line are charged in parallel and relatively large capacitors are normally required as substantial reservoirs of energy must be provided by them. For compactness it is preferred to use chemical capacitors. However these can only be used safely with a predetermined polarity which, if reversed, can result in the capacitors being destroyed. Chemical capacitors are relatively expensive and must be made in relatively large sizes for normal discharge line use. If it is required to alter the storage characteristics of the discharge line it is necessary to remove some of the capacitors and when these are individually of large value, it is not always easy to alter the capacitance of the discharge line by a relatively small value. If the conventional parallel plate capacitor is used instead of a chemical capacitor the volume necessary to contain the large number of capacitors necessary for a high energy discharge line is considerable. Naturally the capacitors are generally arranged in banks mounted within tanks for cooling purposes and these tanks are of relatively large size. If it is required to change the capacitance of the discharge line this can only be done in relatively large steps by removing individual tanks, or in relatively small steps by cutting out sections of a capacitor bank in a tank. A saving in space commensurate with a reduction in energy storage is obtained therefore only if the energy is reduced in relatively large steps corresponding to the capacitance of the individual tanks. For relatively small changes in energy storage no reduction in space is obtained.

An object of this invention is the provision of a capacitor capable of being mounted with others to provide capacitive lines capable of being assembled together to provide an overall capacitance of chosen value which can be altered relatively simply and with a corresponding saving in space.

In accordance with one aspect of this invention an electrical capacitor comprises a body having a longitudinal axis passing through opposite ends of the body, capacitor plates mounted within the body, a dielectric layer separating the plates, and terminals connected to the plates and disposed on the lateral surface of the body at spaced peripheral positions. Such a capacitor may be stored with others to give a coaxial capacitive line as set forth below.

In accordance with a narrower aspect of the invention a coaxial capacitive line has an electrically conductive core arranged inside an electrically conductive tube and has disposed between the core and the tube arcuately spaced capacitors as set forth in the broadest aspect of the invention above, each capacitor having its plates connected respectively to the tube and the core by the terminals. The terminals are preferably peripherally spaced so that they lie on opposite sides of the capacitor body so enabling one terminal to engage the core of the line while the other engages the surrounding tube.

The capacitors may be chemical capacitors and in this case it is preferred to provide guide means to ensure that the capacitors can only be inserted between the core and the tube of the coaxial line in a predetermined manner. The guide means may comprise guide surfaces formed on radially arranged insulative pieces extending between the core of the line and the tube and which cooperate with axially extending guide surfaces provided on the lateral surface of the capacitors so that they can only be slid into the spaces formed between pairs of radial spacer pieces in a particular manner which assures the correct polarity.

It will be appreciated that the capacitors need not be chemical capacitors. In one advantageous construction the capacitor plates comprise, respectively, two interleaved and spirally wound metallic strips spaced by the dielectric layer and to which respective terminals of the capacitor are joined by being welded to the outer end-portions of the two spirally wound strips.

In one advantageous arrangement of the invention the capacitor body has a sheath which encloses the plates and is provided with parallel longitudinally extending slits peripherally spaced about the body and through which extend in a mutually insulative manner respective outer end-portions of the two strips. The sheath may comprise an inner insulative part and an outer metallic part, the two parts having registering slits so arranged that there is no risk of the outer end-portions of the plates coming into contact with the protective metallic part of the sheath.

The invention will now be described in more detail, by way of examples, with reference to the accompanying drawings, in which:

FIGURES 1, 1a, 1b, 3 and 5 individually show in side elevation five different capacitor bodies whose end elevations are respectively shown in FIGURES 2, 2a, 2b, 4 and 6;

FIGURES 10 and 10a, 11 and 12 show cross-sections of three further coaxial capacitive lines for medium power purposes and using capacitors of the invention;

FIGURES 13 and 14 show diagrammatic axial sections through two coaxial capacitive lines, respectively, useful for low power purposes and using capacitors of the invention;

FIGURES 15 to 17 show various ways of arranging coaxial capacitive lines using a coaxial conductor and capacitors of the invention whose diameter is less than the radial width of an annular cavity formed in the line between its core and its surrounding tube; and FIGURES 18 to 23 show diagrammatically various ways of assembling coaxial capacitive lines having capacitors of the invention in order to provide line assemblies or banks of line assemblies of different total capacitance.

Figure 1:
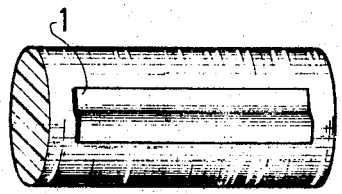
Figure 2:
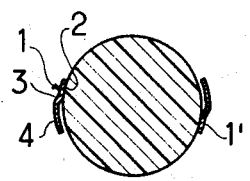

Turning first to the capacitor shown in FIGURES 1 and 2, this comprises a straight cylindrical body containing the plates of the capacitor (not shown) and having flat circular ends. The body is sheathed with electrically insulating material such as a suitable resin, for example, Bakelite, polyamide, ethyl or polyterephthalate and so forth. The capacitor plates positioned within the body, for example, as seen in FIGURE 6a, are spaced by a dielectric layer and are individually connected to metallic contacts or terminals 1, 1' arranged on the later surface of the body at diametrically opposite sides thereof. The terminals 1 and 1' are each formed by a rectangular flexible metal strip, for example bronze or beryllium copper, having a cranked cross-section to provide a portion 2 which is attached to the lateral surface of the body, a spring provided by the cranked region 3 of the strip, and a portion 4 providing the contact part of the terminal and which is spaced laterally away from the surface of the body by the cranked region 3. The contact portions 2 of the terminals are each fixed to one plate of the capacitor by a weld disposed inside the sheath and not shown.

Figure 1A:
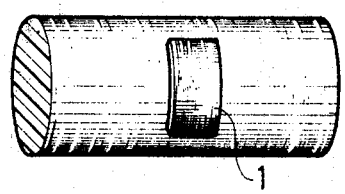
Figure 2A:
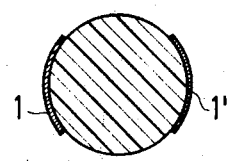

In the capacitor of FIGURES 1a and 2a, the terminals 1, 1' are arcuately arranged rectangular metal strips each extending partially around the periphery of the body and having a surface portion salient on the body to provide the contact surface of the terminal.

Figure 1B:
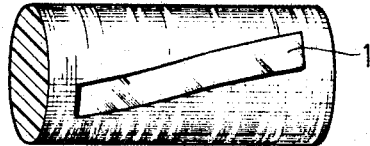
Figure 2B:
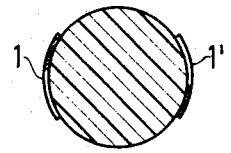

In the capacitor shown in FIGURES 1b and 2b, the terminals 1 and 1' are elongated strips arranged so that they follow a helical path on the surface of the body. The exact dimensions and positions of the terminals of the capacitors in the different embodiments described are, of course normally determined by the voltage and the capacity of the capacitors as well as the nature of their internal construction.

Figure 3:
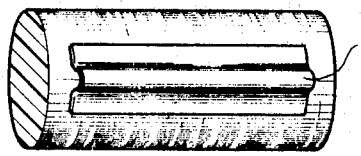
Figure 4:
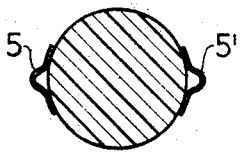

The capacitor shown in FIGURES 3 and 4 has disposed on diametrically opposite sides of its lateral surface two terminals 5 and 5' which have a semirigid nature and are each formed by a rectangular metal strip which is arched in such a way as to provide a salient contact rib.

Figure 5:
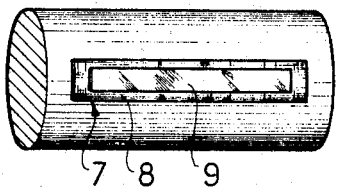
Figure 6:
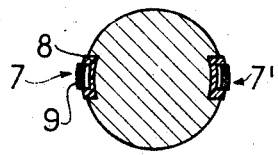
FIGURE 6a is a cross-section through a further construction of capacitor.
Figure 6A:
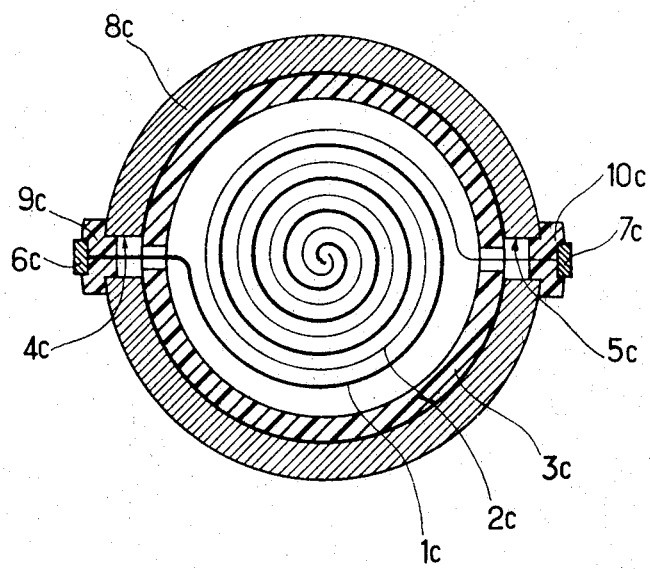

The capacitor of FIGURES 5 and 6 has a metallic external sheath in which are set at diametrically opposite positions of its lateral surface a pair of insulative supports 8 extending axially of the body. Each insulative support effectively insulates from the body one of two terminals 7, 7' each made of a metal strip and projecting, in resilient manner, slightly beyond a rebate formed in the support and accommodating the strip. The salient portion of the strip provides a contact surface 9 for the terminals. The insulative support may be made of any material having suitable properties such as polyamide, a suitable synthetic resin, ethyl polyterephthalate, polystyrene, rubber and so forth.

In a variation of the arrangement shown in FIGURES 5 and 6 the terminal strip is flexibly mounted in the support 8 and a spring disposed between the strip and the support holds the contact surface 9 of the terminal resiliently away from the lateral surface of the capacitor body.

FIGURE 6a shows a cross-section through a capacitor. The capacitor has a pair of parallel plates formed by two spirally arranged and interleaved metal strips 1c, 2c which are spaced from one another by a layer of suitable dielectric. The dielectric layer may comprise a coating of an insulating varnish or lacquer arranged on the surface of one of the strips 1c or 2c, or in a variation, on both surfaces of both of the strips. Alternatively the layer may be composed of several superimposed layers of suitable insulating material such as paper, polyteraphthalate of glycol-ethylene, and so forth, any of which may be suitably impregnated or formed as a suitable impregnation.

The capacitor body is provided with a two-part sheath. The inner part of the sheath is referenced 3c and is made of an insulating material preferably molded with two slit openings suitably arranged, but not essentially so, on diametrically opposite sides of the body. Each slit opening allows the outer end-portion of one of the strips 1c, 2c to be led through it.

The outer part of the sheath is provided by a metallic casing 8c having slots 4c, 5c formed in it at positions which register with the slit openings in the insulated part 3c of the sheath. The slots 4c, 5c are of greater widths than the slit openings and they are plugged by insulative pieces 9c, 10c arranged on the lateral surfaces of the body as shown. Each of the pieces 9c, 10c supports a terminal 6c, 7c which are embedded in the external surfaces of the pieces 9c, 10c and are welded to the marginal end-portions of the strips 1c, 2c. The insulative pieces 9c, 10c co-operate with the slit openings in the insulative part 3c of the sheath to prevent any risk of the outer end-portions of the strips 1c, 2c coming into contact with the protective metallic casing 8c of the capacitor. It should be noted that the arrangement of the terminals shown in FIGURE 6a results in a significant reduction in the parasitic induction which occurs between conventionally arranged terminals disposed at one or both ends of a capacitor in traditional manner.

The examples of capacitors given above are purely by way of example and they are in no way restrictive. For example, the capacitors need not be cylindrical although it is preferred that they have at least one part cylindrical surface, and the opposite ends of the capacitors need not be circular or flat. Moreover, the contacts may be of any kind provided that they are arranged on the lateral surface of the body at peripherally distributed positions to enable them to be used with a coaxial capacitive line configuration as is described in more detail below.

The capacitors described above enable coaxial capacitive lines to be constructed relatively easily in a way enabling any desired value of capacitance to be built up by inserting individual capacitors between a conductive core 11 of the coaxial line and an external conductive tube 12 which is coaxially arranged around the core. Various methods of building up coaxial lines in this way are set out in detail below.

Figure 7:
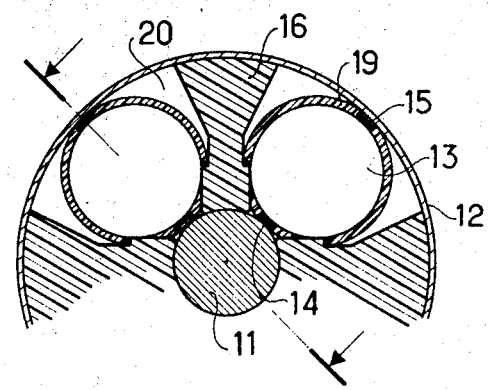
FIGURE 7 shows diagrammatically a cross-section of a part of a coaxial capacitive line using capacitors of the invention.
Figure 8:
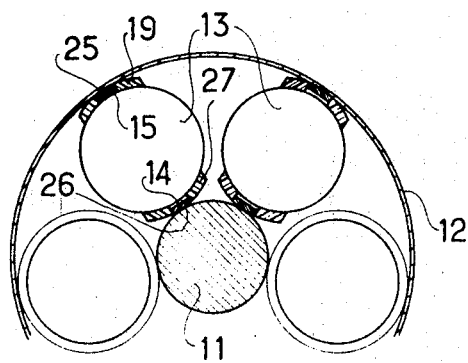
FIGURE 8 is a cross-section of another embodiment of coaxial capacitive line for high power purposes and having capacitors of the invention.
Figure 9:
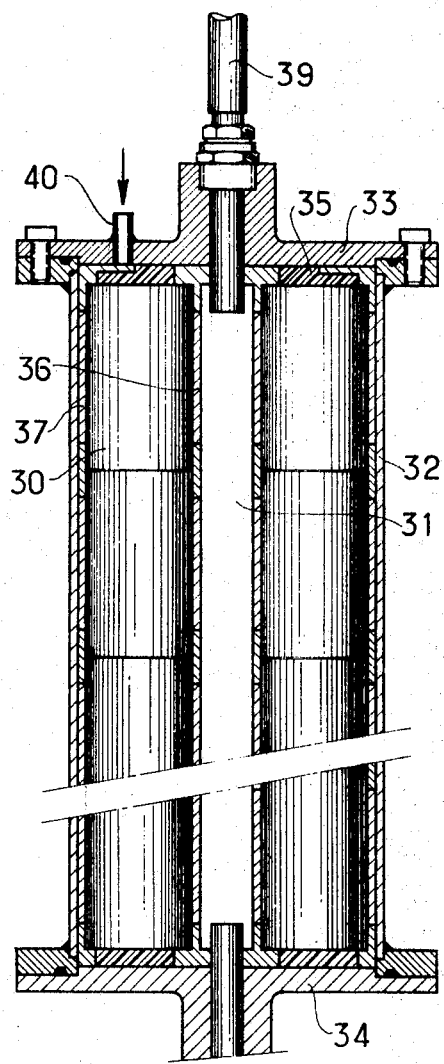
FIGURE 9 is a broken axial section of a further form of capacitive line using capacitors of the invention and showing the end connections to the line.

FIGURES 7 to 9 show a rigid capacitive coaxial line which may have a diameter lying between 50 millimeters and 1 millimeter and is suitable for high power purposes.

The coaxial capacitive line of FIGURE 7 has the internal core 11 and the external tube 12 defining between them an annular cavity in which are inserted arcuately spaced capacitors 13 which extend axially parallel to the core 11. The capacitors have substantially cylindrical bodies each provided on its lateral surface with a pair of peripherally spaced terminals arranged at diametrically opposite positions and extending parallel to the axis of the capacitor body. Each capacitor has one terminal 14 in electrical contact with the core 11 and one terminal 15 in contact with the surrounding tube 12.

The capacitors are insulated from one another by radially extending support pieces 16 made of an electrically insulative material. The support pieces are provided with guide surfaces which engage suitable surfaces formed in the lateral surface of the capacitor to orient it so that there is no risk of it being inserted into the space 20 provided between a pair of supports 16 with the wrong polarity.

Figure 7A:
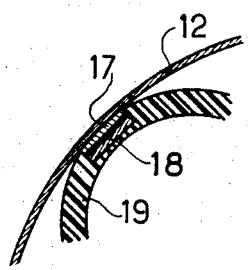
FIGURE 7a shows to an enlarged scale a detail of FIGURE 7.

One of the terminals of the capacitor is shown to an enlarged scale in FIGURE 7a from which it will be seen to comprise a metallic strip 17 held in an insulative sheath 19 of the capacitor body and sprung outwardly by a spring 18 disposed between the terminal 17 and the underlying region of the sheath 19.

Figure 7B:
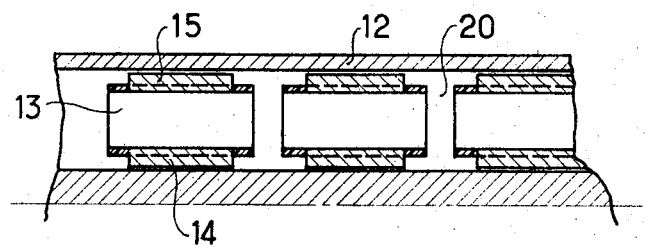
FIGURE 7b represents a fragment of the same line in axial section.

The spaces 20 may be filled with an insulating substance having a high dielectric after air has been removed. Such substances may be gaseous as, for example, sulphur hexafluoride, a liquid with insulating properties such as a suitable oil, or a solid insulative material such as a resin, a ceramic, ethylene polyterephthalate and so forth. A number of capacitors can be arranged end to end in the coaxial line in each of the spaces 20 as is shown in FIGURE 7b to provide the desired capacitance between the core 11 and tube 12 of the coaxial line.

Figure 8A:
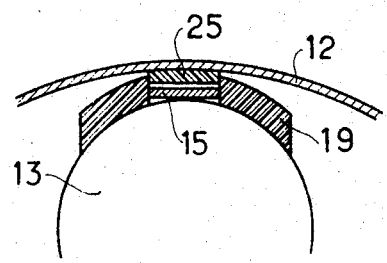
FIGURE 8a shows to an enlarged scale a detail of the line of FIGURE 8.

FIGURE 8 shows a cross-section of a coaxial capacitive line which differs from the line of FIGURE 7 in that the capacitors are located in position by ribs 25 and 26 welded, respectively, to the casing 12 and the core 11 of the line. Each capacitor is provided with a pair of diametrically opposite electrical terminals 14 and 15 which are outwardly sprung strips of a suitable metal such as beryllium copper fixed in a rebate in an insulative support 11 integral with the body of the capacitor 13. As is clearly shown in FIGURE 8a, the ribs 25, 26 locate in the rebates in the supports 19 in which the terminals 14, 15 are fitted so that they press against the terminals and make good electrical contact with them. The dimensions of the ribs 25, 26 are suitably different and the rebates are dimensioned so as to be complementary to the ribs. In this way the capacitors can be oriented so that they are firmly held between the core 11 and the tube 12 by the ribs 25, 26 and there is no risk of the polarity of any of the capacitors being inadvertently reversed during fitting of the capacitor in position in the annulus of the line. This is of importance when the capacitors are chemical dielectric capacitors.

FIGURE 9 shows opposite end-portions of a coaxial capacitive line containing between a core 31 and a tube 32 a number of arcuately spaced rows or strings of capacitors 30. Opposite ends of the line have end supports 33 and 34, respectively, which are clamped to radial flanges welded to opposite ends of the tube 32. Each of the capacitors is provided with an outer terminal 37 which engages the tube 32 and an inner terminal 36 which engages the core 31. Insulative collars surround the adjacent end-portions of neighboring capacitors 30 of a row and locate between the terminals 37 and the terminals 36. Insulative end pieces 35 hold the rows of capacitors 30 against endwise movement and further insulation serves to prevent the end supports 33 and 34 which are electrically joined to the tube 32, being electrically connected to the core 31. The connections to the ends of the line are made by coaxial connectors 39 having an outer part and an inner part, the outer part being electrically connected to the end supports 33 and 34, and the inner part extending in insulative manner through the end support 33 and being electrically joined to the core 31. The coaxial connector 39 may be of standard type.

If desired, high power lines constructed as shown in FIGURE 9 can be gassed or charged with a suitable insulating liquid admitted through the pipe 40. The various capacitors 30 in the line are electrically connected in parallel between the core 31 and the tube 32 so that if it is desired to increase the overall capacitance of the line it is only necessary to increase its length in order to accommodate an additional number of capacitors to provide the extra capacitance.

FIGURES 10 to 12 show coaxial capacitance lines suitable for medium powers and having diameters between 20 millimeters and 50 millimeters.

The coaxial line shown in FIGURE 10 uses capacitors 50 of straight segmental shape and substantially trapezoidal in cross-section to enable them to substantially fill the available space between the core 11 of the line and its coaxially arranged outer tube 12. The capacitor 50 is provided with a single electrical terminal 52 which engages the core 11 while two spaced electrical terminals 51 are provided to engage the inside surface of the tube 12. The terminal 52 comprises a small metallic plate embedded and partially projecting from the lateral surface on the narrower inside portion of the segment so that it can abut directly onto the external surface of the core 11. The other pair of terminals 51 are resilient and assist the positioning of the capacitor as well as assuring good electrical contact with the tube 12 and the core 11.

In the coaxial line shown in FIGURE 11 and designed for medium energy storage, the location of each capacitor 60 is facilitated by the shape of one terminal 61 which is manufactured from a flexible metallic strip of large size and attached by its intermediate portion to a part cylindrical surface on the capacitor body so as to provide a pair of legs 63, 64 which are bowed towards one another to provide a firm resilient base of relatively large area which provides an electrical terminal making good contact with the inside surface of the tube 12. A second terminal 65 engages the outside surface of the core 11 of the line and is similarly constructed to the terminal 52 of the capacitor shown in FIGURE 10a. In like manner it is held firmly in contact with the periphery of the core 11 by the inherent resilience of the outer terminal 61.

Turning now to FIGURE 12 this shows a coaxial capacitive line having cylindrical capacitors 70 held between a pair of concentrically arranged rings 71 and 74. The ring 71 encircles the core 11 and has inwardly directed springy feet 72 which slide along the core and make good electrical contact therewith. In a similar manner the outer ring 74 is provided with outwardly directed springy feet 75 positioned to slide against the inside surface of the tube 76 on the coaxial line so as to make good electrical contact therewith. The annular space between the two rings 71 and 74 is filled with a ring of arcuately spaced capacitors 70 each having one lateral terminal 73 welded to the inner ring 71, and a diametrically opposite lateral terminal welded to the inside surface of the outer ring 74.

The rings 73, 74 together with the capacitors contained between them allow rapid assembly and dismantling of a capacitive coaxial line as the two metal rings can be slid bodily into position in the line to provide it with the desired value of capacitance.

FIGURES 13 and 14 show different arrangements for providing a flexible coaxial capacitive line required for relatively small energy storage and having a correspondingly small diameter.

In FIGURE 13 the line is provided with cylindrical capacitors 80 having on the lateral surface of their bodies diametrically opposite terminals 81 and 82. The terminals 81 are respectively welded at spaced positions to the inside surface of the outer tube 12 of the line. The lateral terminals 82 are welded to a ring 83 which is threaded onto the core 11 of the line and is welded to the core at the position at which a ring of capacitors is to be located. In this way excellent electrical connections of the capacitors to the core and tube are obtained. The space 20 between the capacitors is preferably filled with a suitable insulating substance.

In the capacitive coaxial line of FIGURE 14 the cylindrical capacitors 80 have one or more elastic fingers 85 which extend from the terminal of the capacitors adjacent the core 11. The fingers are held against the core 11 by an encircling springy ring 83 which is threaded on the core 11 and is sprung over the fingers 85. With this arrangement it is unnecessary to make any welded connection between the capacitor terminals and the core 11 and the mechanical connection afforded by the fingers 85 allows some relative longitudinal movement to occur between the core 11 and the tube 12 to accommodate flexing of the tube. The outer terminals 81 of the capacitors 80 are suitably welded to the inside surface of the tube 12.

Preferably for lines of small diameter, a dielectric vinyl plug is introduced between neighboring capacitors 80 to assist the flexibility of the line. The external surface of the tube 12 is preferably covered with a suitable layer of insulation.

FIGURES 15 to 17 show how capacitors of smaller diameter than the radial distance between a core 11 and tube 12 of a coaxial line can nevertheless be accommodated between them. In the arrangement shown in FIGURE 15, the capacitors 90 are laid against the core 11 so that each has one terminal in contact with the core, and are held in place by a metal ring 92 which engages the other terminal of each capacitor 90 and is electrically connected to the external tube 12 of the coaxial line by a suitable conductive strap or straps (not shown).

In the embodiment shown in FIGURE 16 and in axial section in FIGURE 17, the capacitors 100 are laid against the inside surface of the tube 12 of the coaxial line and have lateral terminals 101 which press against the inside surface of the tube 12 in much the same way as the terminal 61 of the capacitor illustrated in FIGURE 11 described above. The capacitors 100 also have lateral terminals 107 similarly arranged and constructed as the terminals 65 of FIGURE 11.

The core 11 of the line has threaded onto it an insulative sleeve 102 on which are supported metal clips 103. Each clip, as clearly shown in FIGURE 17, provides one leg 105 embedded in the outside surface of the sleeve 102 and which provides a contact engaged by the terminal 107 of one of the capacitors. The other leg 104 of the clip is inwardly bowed and has a springy nature to enable it to be flexed resiliently against the core 11 to make good electrical contact with it.

FIGURES 18 to 23 show diagrammatically various assemblies of coaxial capacitive lines constructed as described above.

Figure 18:
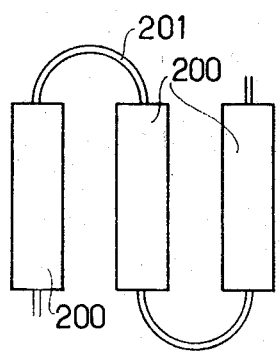

FIGURE 18 shows a coaxial capacitive line assembly composed of several lines 200 connected in series by a single connecting cable 201 extending between their cores 11. The tubes 12 of the lines may be clamped together side-by-side to provide the assembly with an overall capacitance equal to the sum of the capacities of the individual lines 200.

Figure 19:
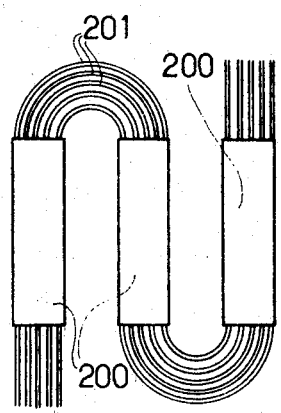

FIGURE 19 shows three stacks 300 each containing five line assemblies constructed as shown in FIGURE 18. The cores of the five assemblies of each stack are serially connected between the stacks by five coaxial connectors 201.

Figures 20, 21:
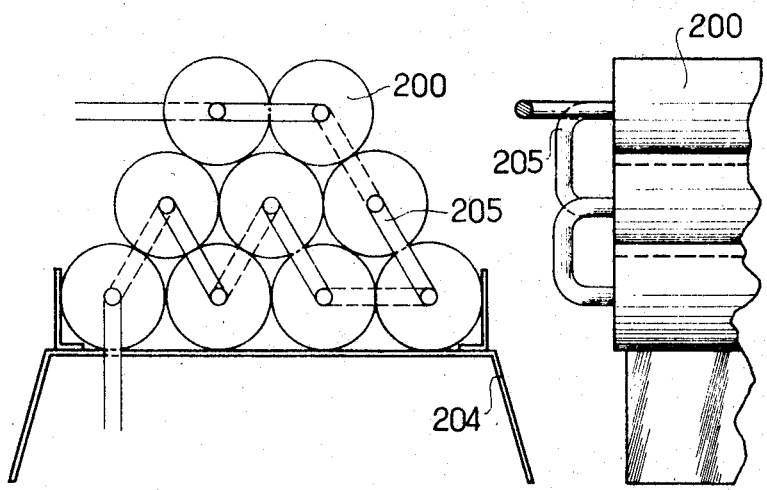

FIGURES 20 and 21 show how nine coaxial capacitive lines may be assembled together side-by-side on a base 204 to provide a capacitor having a capacitance equal to the sum of the capacities of individual lines. It will be noticed that short connectors only are necessary between the cores of the lines and that alternate connectors are disposed at one end of the assembly while the remaining connectors are disposed at the other end. The connectors are so arranged that their lengths are so short there is no risk whatever of the connectors of neighboring banks coming into contact with one another. Also the arrangement of the connectors at both ends of the bank provides a neat orderly arrangement and no interruption of the cooling spaces extending between neighboring lines of the assembly. The lines can be clamped together to provide good electrical conduction between the tubes 12 of the different lines of the assembly.

Figure 22:
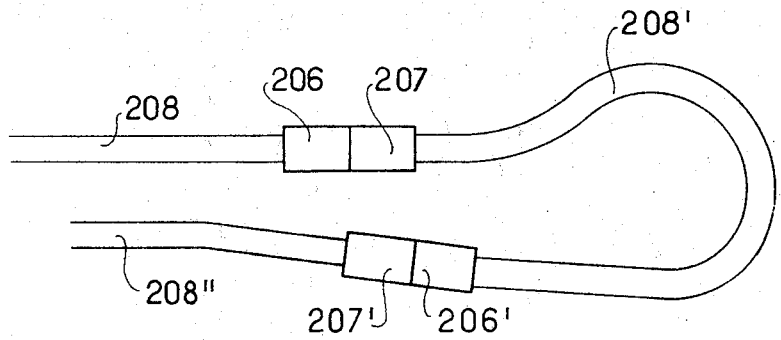

FIGURE 22 shows a disconnectible connector which may be used between the lines of the assembly shown in FIGURES 20 and 21. Externally threaded attachments 206, 206' and internally threaded attachments 207, 207' of several flexible lines of small diameter 208, 208', 208'' are provided for the end of the connectors.

Figure 23:
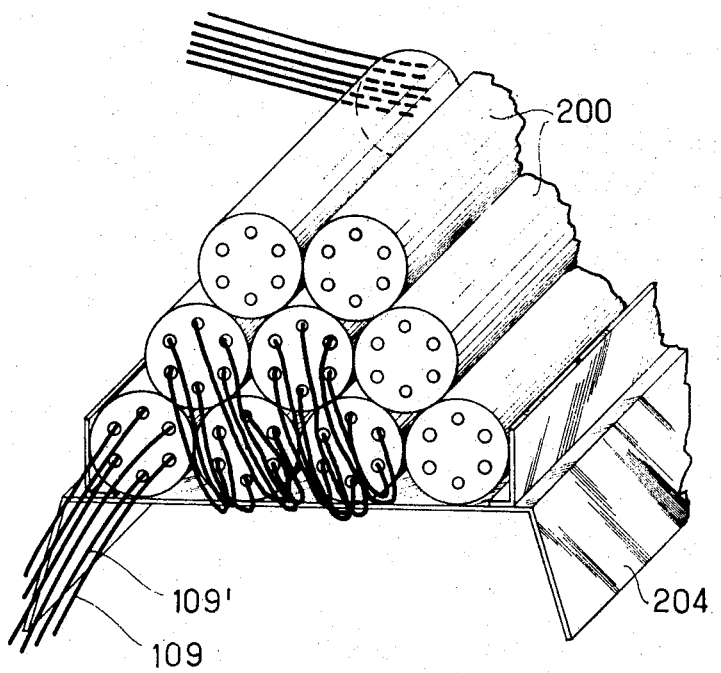

FIGURE 23 is a perspective view of a capacitive bank formed by nine assemblies 304 each containing six coaxial capacitive lines moulded together in an insulative cylindrical body so as to form therein an arcuately spaced parallel array of lines. The lines of respective assemblies are interconnected by conventional coaxial cables 109, 109' and the bank is supported on a base 204.

I claim:

1. An electrical capacitor comprising a body having a longitudinal axis passing through opposite ends of said body, capacitor plates mounted within said body, a chemical dielectric layer separating said plates, terminals connected to said plates and disposed on the lateral surface of said body at spaced peripheral positions, and guide means formed on a sheath surrounding said plates and said layer for insuring connection to said terminals with proper polarity.

2. An electrical capacitor comprising a body having a longitudinal axis passing through opposite ends thereof, capacitor plates mounted within said body, a dielectric layer separating said plates, and terminals connected to said plates and disposed on the lateral surface of said body, and including a metallic casing forming an outer part to said sheath and having slits and insulative pieces positioned in said slits, electrical connections extending from said plates through said slits to respective ones of said terminals, which terminals are provided on said insulative pieces.

3. A capacitor as defined in claim 1 wherein said terminals are spring-like strips having a resilient portion spaced from said body.

4. A multi-section capacitor assembly having an electrically conductive core, an electrically conductive tube concentrically arranged around said core, arcuately spaced capacitors disposed between said core and said tube, each such capacitor comprising a body having a longitudinal axis passing through opposite ends thereof, capacitive plates mounted within said body, a dielectric layer separating said plates, and terminals connected to the plates and disposed on the lateral surface of said body at spaced peripheral positions at which one of said terminals engages the inside surface of said tube and a second of said terminals engages the outside surface of said core.

5. A multisection capacitor assembly as set forth in claim 4 including guide means cooperating with each of said capacitors and said tube for ensuring a correct orientation of said capacitors.

6. A multisection capacitor assembly as set forth in claim 4, including radial insulative spaces disposed between said arcuately spaced capacitors, and guide means disposed on said spaces cooperating with guide surfaces on said capacitors to ensure a correct orientation of said capacitors.

7. A multisection capacitor assembly as set forth in claim 4, wherein said arcuately spaced capacitors are each welded by at least one terminal to a metal ring disposed between said core and said tube, which ring is provided with means for completing a capacitive circuit between the core and the tube by way of the ring and the terminals of the capacitors attached thereto.

8. A multisection capacitor assembly as defined in claim 4, wherein said capacitor bodies are of segmental shape.

9. A multisection capacitor assembly as defined in claim 4, including a plurality of arcuately spaced conductive ribs positioned in radial alignment on the inner surface of said tube and the outer surface of said core, the respective terminals of said capacitors contacting respective conductive ribs.

10. A multisection capacitor assembly as defined in claim 9 wherein the ribs on said core are dimensioned differently from the ribs on said tube.

11. A multisection capacitor assembly as defined in claim 4, including radial flanges positioned over the open ends of said tube and a coaxial connector secured in one of said flanges and connected to said tube and said core by means of respective conductors.

12. A multisection capacitor assembly as defined in claim 4 including a plurality of conductive rings threaded on said core at spaced points, each ring connecting a terminal of a capacitor to said core.

13. A capacitor as defined in claim 2 wherein said terminals are spring-like strips having a resilient portion spaced from said body.

14. An electrical capacitor comprising a body having a longitudinal axis passing through opposite ends of said body, capacitor plates mounted within said body, a dielectric layer separating said plates, and terminals connected to said plates and disposed on the lateral surface of said body at spaced peripheral positions, said terminals being resiliently mounted within channels in the surface of said body so as to be biased radially outwardly.

References Cited

UNITED STATES PATENTS

| | | | |
|---|---|---|---|
| 1,610,980 | 12/1926 | Silberman | 317—242 |
| 1,681,884 | 8/1928 | Goodman | 317—261 |
| 2,270,953 | 1/1942 | Manz. | |
| 2,516,529 | 7/1950 | Raymond | 317—242 X |
| 3,014,167 | 12/1961 | Winter | 317—242 X |
| 3,134,930 | 4/1964 | Wright. | |
| 3,206,660 | 9/1965 | McCutchen | 317—260 |

FOREIGN PATENTS 838,632  7/1949  Germany.

ELLIOT A. GOLDBERG, Primary Examiner

U.S. Cl. X.R.

333—24; 317—260, 256